No. 643,724. Patented Feb. 20, 1900.
J. H. MORRIS.
VEHICLE WHEEL.
(Application filed June 26, 1899.)
(No Model.)
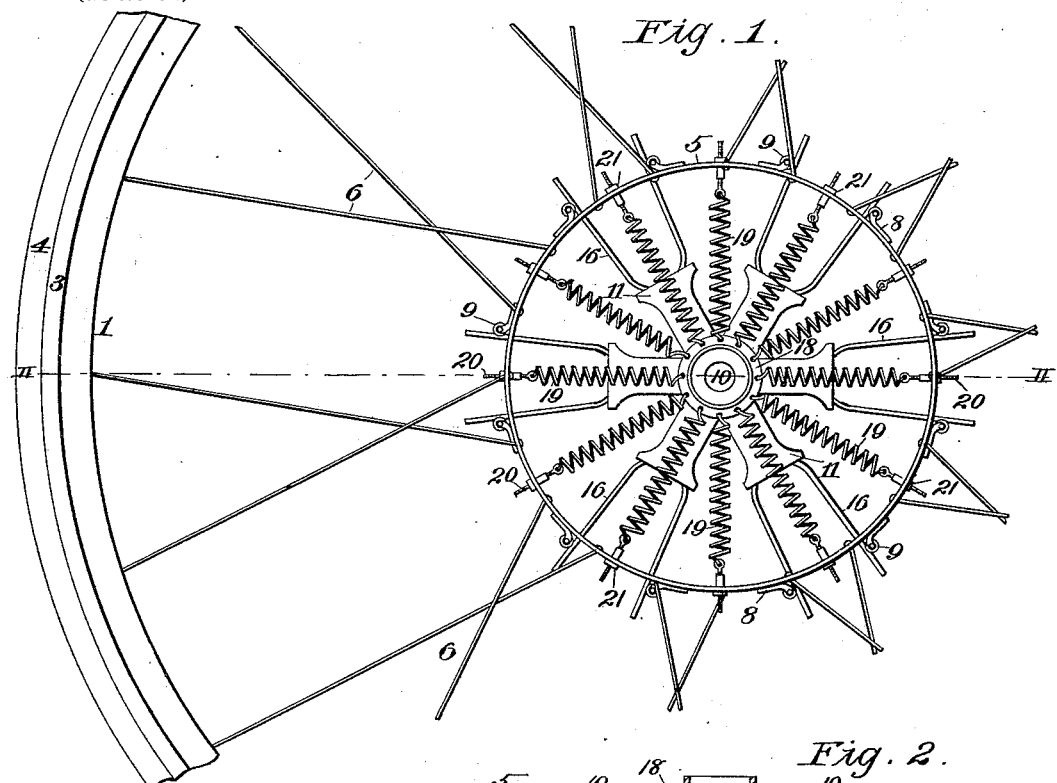
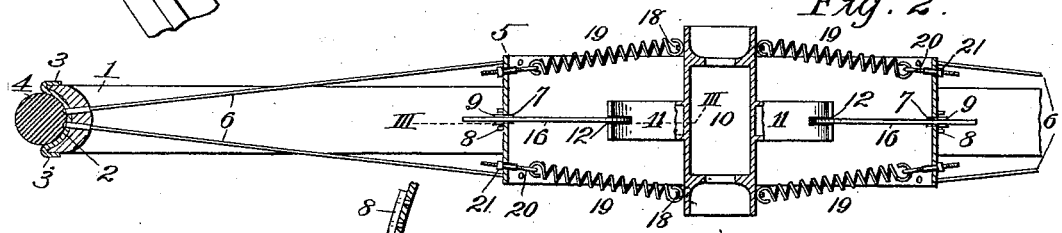
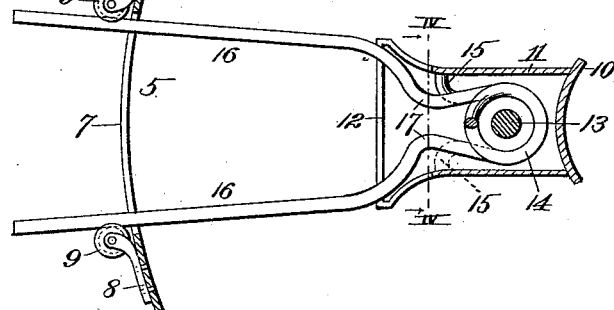
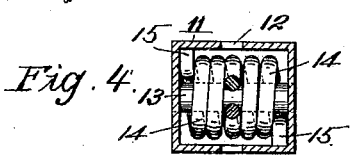
Witnesses:
H. C. Rodgers
M. P. Remley
Inventor
J. H. Morris,
By Higdon, Fischer & Thorpe
Attys.
THE NORRIS PETERS CO., PHOTO-LITHO., WASHINGTON, D. C.

UNITED STATES PATENT OFFICE.

JOHN H. MORRIS, OF FREMONT, NEBRASKA.

VEHICLE-WHEEL.

SPECIFICATION forming part of Letters Patent No. 643,724, dated February 20, 1900.

Application filed June 26, 1899. Serial No. 721,814. (No model.)

*To all whom it may concern:*

Be it known that I, JOHN H. MORRIS, of Fremont, Dodge county, Nebraska, have invented certain new and useful Improvements in Vehicle-Wheels, of which the following is a specification.

My invention relates to vehicle-wheels, and more especially to that class wherein the outer section when the wheel is in service is eccentric of the inner section or hub, said outer section being yieldingly connected to the hub for the purpose of reducing the vibration and insuring increased speed because of the resilient properties of the wheel; and my object is to produce a wheel of this character of simple, strong, durable, and inexpensive construction.

To this end the invention consists in certain novel and peculiar features of construction and combinations of parts, as will be hereinafter described and claimed; and in order that the invention may be fully understood I will proceed to describe it with reference to the accompanying drawings, in which—

Figure 1 represents in side elevation a part of a wheel constructed in accordance with my invention. Fig. 2 represents a section taken on the line II II of Fig. 1. Fig. 3 represents an enlarged section taken on the line III III of Fig. 2. Fig. 4 is a cross-section taken on the line IV IV of Fig. 3.

In the said drawings, 1 designates the rim or felly of a wheel of substantially the same form as the rim of an ordinary bicycle-wheel, and 2 designates a thin metallic band circumferentially embracing and conforming to the concave face of the rim and provided with the overlapping flanges 3, embracing the sides of the rim and holding the band in place, and secured in the groove of said band is a rubber tire 4, preferably solid.

5 designates what I term the "subsidiary" or "supplemental" hub of the wheel, said subsidiary hub consisting of a metallic hoop arranged concentrically within the rim and connected thereto by means of spokes 6 of the type shown or any other preferred type. Said subsidiary hub is provided with a series of equidistant elongated slots 7 and carries at opposite ends of said slots the brackets 8, in which are journaled grooved guide-rollers 9, said rollers projecting inward of the ends of the slots, for a purpose which will hereinafter appear.

10 designates the hub proper of the wheel, adapted to be journaled upon the axle (not shown) in the usual or any preferred manner, and projecting radially outward from the center of said axle are the holders 11, said holders being brazed or otherwise secured rigidly to the hub and provided in their outer ends with vertical slots 12. The holders are also provided with cross-pins 13, upon which are mounted side by side the coil-springs 14, terminating at their outer ends in short arms 15, bearing against the walls of the holders, and at their inner ends in spring-arms 16, said arms 16 occupying the same vertical plane as and projecting outwardly through the slots 12 of the holders and the slots 7 of the subsidiary hub and engaging at all times the antifriction-rollers 9 at the opposite ends of the slots of the last-named hub. The spring-arms 16 within the holders are bent toward each other, as at 17, in order to permit said arms to diverge more widely than as shown without requiring a holder of undue proportions. These spring-arms 16, while imparting lateral stiffness to the wheel—that is to say, while preventing any relative lateral movement between the hub and the subsidiary hub—provide for a relative movement of said parts in a radial direction—that is to say, while the spring-arms 16, projecting from the holders 11 through the slots 7, prevent any substantial lateral movement of the subsidiary hub relative to the hub proper, they afford practically no resistance to an up-and-down movement of the hub 10 within the subsidiary hub, because the arms 16 are arranged to slide back and forth upon the antifriction-rollers 9, and it is furthermore obvious that the heavier the weight upon the axle the more eccentric will the relation between said hubs become. Said spring-arms, in addition to imparting the requisite lateral stiffness, also serve to confine the radial movement of the hub to a straight up-and-down movement. The real support of the hub, however, is a plurality of retractile springs 19, which are hooked at their inner ends to the perforated flanges 18 of the hub and at their outer ends to the eyebolts 20, said eyebolts being engaged by the nuts or nipples 21, journaled in the subsidiary hub. In order to give these springs the requisite tension for ordinary service, they are constructed or wound with their coils or convolutions touching and being hooked at their inner ends to the hub-flanges are stretched to the requisite tension by turning the nuts or nipples 21, this operation obviously adjusting the eyebolts 20 radially of the wheel. These springs form a yielding connection between the hub and the subsidiary hub, and as the wheel rotates in service they are stretched as they successively assume a position above the horizontal plane of the axle, which therefore occupies a position vertically below the center of the subsidiary hub. Just above the statement was made that they are successively stretched as they assume a certain position. This statement being true, it is obvious that the weight of the vehicle, exclusive of the wheels, is always sustained by a majority of the springs, which, extending radially above in advance and in rear of the hubs, serve to prevent the latter from moving forward or rearward of the center of the subsidiary hubs, the diverging spring-arms 16 serving to assist in holding the hub in said position by their pressure in opposite directions against the rollers 9.

In action as the vehicle moves its body is supported with but little vibration at about the same distance from the ground at all times, because as the wheels encounter obstructions they ride over them easily, because the springs 19 above the axle yield to the increased resistance to the movement of the wheels, the latter therefore clearing the obstructions more easily than if they were compelled to raise the body of the vehicle also, and as the wheels clear said obstructions the hub and subsidiary hub resume their original relation, the springs effecting this result because the added resistance to the movement of the wheels has been removed.

From the above description it will be apparent that I have produced a vehicle-wheel which embodies the features of advantage enumerated as desirable in the statement of invention, and it is to be understood that I reserve the right to make such changes in the detail construction, form, proportion, or arrangement of the parts as will not be a departure from the spirit and scope or sacrifice any of the advantages of the invention.

Having thus described the invention, what I claim as new, and desire to secure by Letters Patent, is—

1. A vehicle-wheel, comprising a rim, a subsidiary hub arranged concentrically within and rigidly connected to the rim, and provided with a series of slots, the hub proper arranged within the subsidiary hub and provided with a series of holders, and coil-springs mounted in said holders and terminating in short arms bearing against the holders and long arms projecting through the slots of the subsidiary hub, substantially as described.

2. A vehicle-wheel, comprising a rim, a subsidiary hub arranged concentrically within and rigidly connected with the rim, and provided with a series of slots, and with grooved antifriction-rollers at the ends of said slots, the hub proper arranged within the subsidiary hub and provided with a series of holders, and coil-springs mounted in said holders and terminating in short arms bearing against the holders and long arms projecting through the slots of the subsidiary hub and engaging said antifriction-rollers, substantially as described.

3. A vehicle-wheel, comprising a rim, a subsidiary hub arranged concentrically within and rigidly connected with the rim, and provided with a series of slots, the hub proper arranged within the subsidiary hub and provided with a series of holders, coil-springs mounted in said holders and terminating in short arms bearing against the holders and long arms projecting through the slots of the subsidiary hub, and a series of springs connecting the hub with the subsidiary hub, substantially as described.

4. A vehicle-wheel, comprising a rim, a subsidiary hub arranged concentrically within and rigidly connected with the rim, and provided with a series of slots, the hub proper arranged within the subsidiary hub and provided with a series of holders, coil-springs mounted in said holders and terminating in short arms bearing against the holders and long arms projecting through the slots of the subsidiary hub, a series of springs connecting the hub with the subsidiary hub, nipples journaled in the subsidiary hub, eyebolts engaging said nipples, and retractile springs connecting said eyebolts with the hub, substantially as described.

In testimony whereof I affix my signature in the presence of two witnesses.

JOHN H. MORRIS.

Witnesses:
A. R. OLESON,
JULIUS BECKMAN.